United States Patent [19]
Miyakawa et al.

[11] 4,068,138
[45] Jan. 10, 1978

[54] SIGNAL CONVERTER
[75] Inventors: Nobuaki Miyakawa, Hitachi; Osamu Igarashi, Katsuta, both of Japan
[73] Assignee: Hitachi, Ltd., Japan
[21] Appl. No.: 687,108
[22] Filed: May 17, 1976
[30] Foreign Application Priority Data
  May 16, 1975  Japan .................................. 50-57311
[51] Int. Cl.$^2$ .......................... H03K 1/12; G08B 5/38; H03K 5/00
[52] U.S. Cl. ................................. 307/262; 307/236; 307/354; 307/362; 340/228 R; 340/248 A
[58] Field of Search ............... 307/262, 235 E, 235 T, 307/236; 328/26, 57, 118; 340/347 M, 248 A, 228 R; 323/19, 68

[56] References Cited
U.S. PATENT DOCUMENTS
3,502,905  3/1970  Bicking ................................ 307/251
3,882,327  5/1975  Brown, Jr. et al. .................. 307/236

Primary Examiner—Stanley D. Miller, Jr.
Assistant Examiner—Marcus S. Rasco
Attorney, Agent, or Firm—Craig & Antonelli

[57] ABSTRACT

A signal converter for converting a varying input voltage, such as an output signal from a detector, into an output voltage in absolute value, including an operational amplifier, a comparator and two groups of electronic switches. The comparator compares the varying input voltage to a predetermined reference voltage. The operational amplifier has negative and positive input terminals and generates an output voltage signal in proportion to the difference between the voltages applied to its two input terminals. When the input voltage is less than the reference voltage, one group of electronic switches turns on, so that the input voltage and the reference voltage are applied to the negative and the positive input terminals of the operational amplifier, respectively. When the input voltage is greater than the reference voltage, the other group of the electronic switches turns on, so that the input voltage and the reference voltage are applied to the positive and the negative input terminals of the operational amplifier, respectively.

13 Claims, 4 Drawing Figures

SIGNAL CONVERTER

BACKGROUND OF THE INVENTION

This invention relates to a signal converter, particularly to a signal converter in which a certain input signal, such as a voltage signal from a temperature sensor, a position detector, a techogenerator or the like, can be converted into an output signal in an absolute value substantially proportional to the difference between the input signal and a predetermined reference.

There is often the need for conversion of a signal to absolute value in various applications. In the case, for example, where a detected signal which changes both in the negative and the positive ranges is indicated in digital form, it is necessary that the absolute value of the detected signal and the sign thereof are provided. The absolute value in analog form is converted into a signal in the digital form, and the converted signal and the negative or positive sign are separately indicated by means of respective indicators.

Signals of such nature may represent, for example, a varying temperature, a position detecting signal, a speed difference signal from a predetermined reference and the like. For easy understanding of this invention, the following description will relate to temperature indications.

Various known temperature sensors have either a monotonously incremental characteristic or a monotonously decremental one in relationship of a detected output voltage to a temperature to be detected; for example, the Temperature Sensitive Resistor TSR 5-1001F (made by Corning Co., U.S.A.) has such an incremental characteristic, and a known thermistor element has such a decremental characteristic. Therefore, in order to produce a signal corresponding to the absolute value of the detected temperature, it is necessary to provide a signal converter which exhibits a decremental characteristic in a range of minus temperature and an incremental characteristic in a range of plus temperature with the boundary at 0° C. Such a conventional signal converter has two amplifiers. One of the amplifiers has a decremental characteristic and is used for the range of minus temperatures and the other has an incremental characteristic and is used for the range of plus temperatures. The two amplifiers are switched over to each other with the boundary at 0° C. The signal converter of this type has the disadvantage that the two amplifiers are necessary, whereby the converter has a large number of components and is therefore expensive.

SUMMARY OF THE INVENTION

An object of this invention is to provide a signal converter which has one amplifier, whereby the converter has a small number of components and is accordingly inexpensive.

Such object has been attained by a signal converter which comprises a comparing means for comparing an input signal to a predetermined reference and for generating a control signal, an operational amplifier circuit having two input terminals to which the input signal and the predetermined reference are applied respectively and for generating a signal proportional to the difference between the input signal and the predetermined reference, and switching means for exchanging the applied signals between the two input terminals of the operational amplifier circuit in response to the control signal from the comparing means.

DETAILED DESCRIPTION OF PREFERRED EMBODIMENTS

Figure 1:
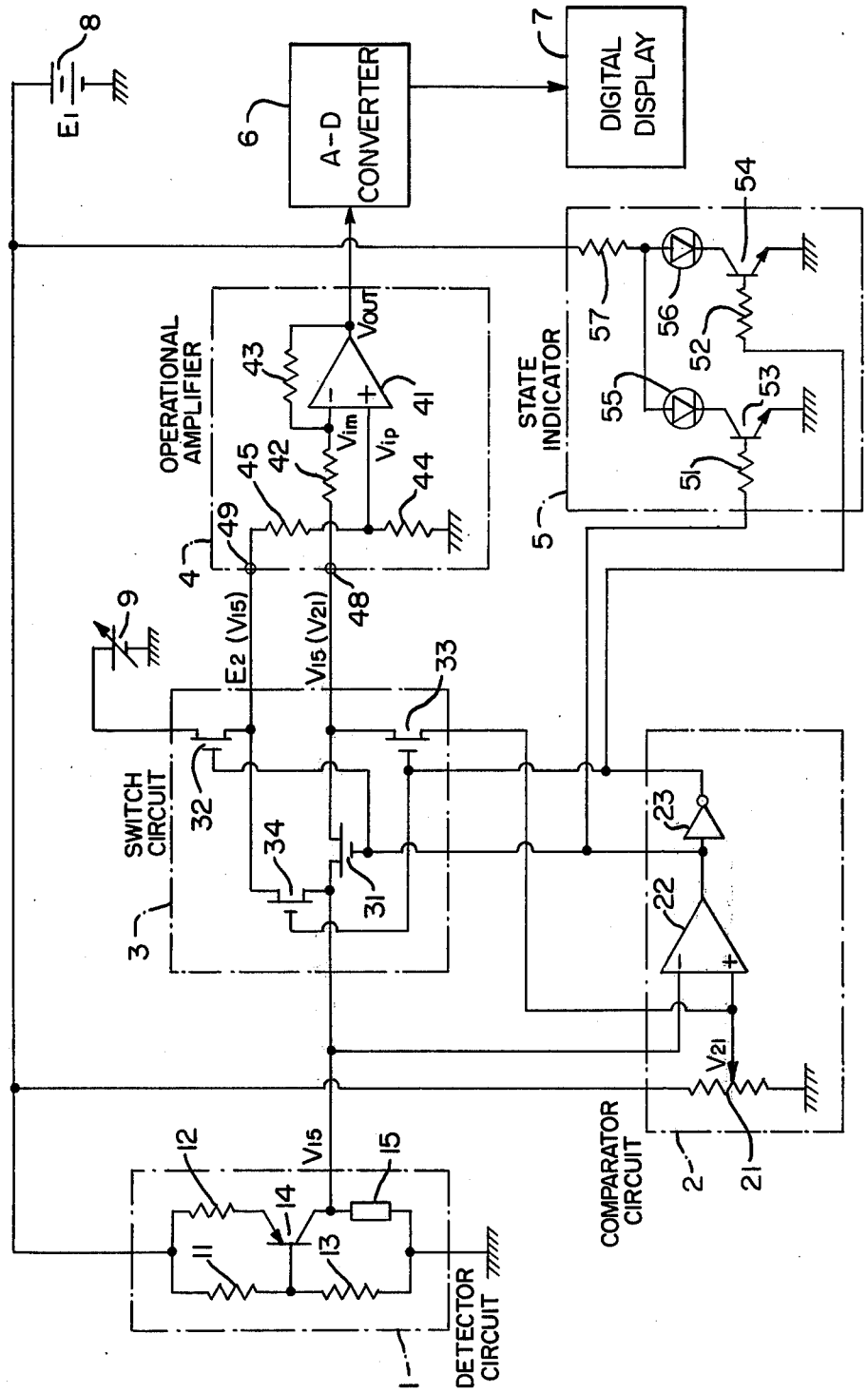
FIG. 1 shows a temperature displaying device which employs a signal converter of an embodiment according to this invention.
Figure 2:
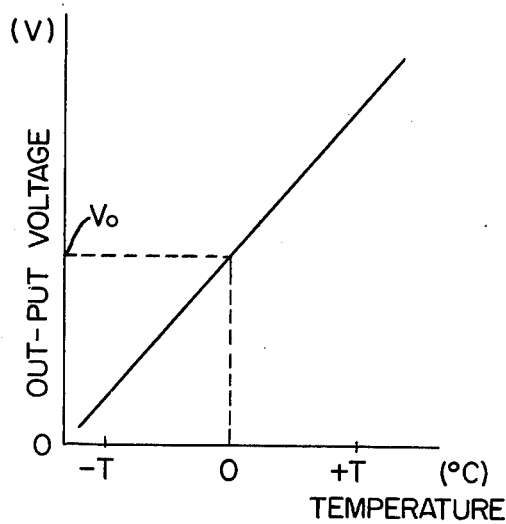
FIG. 2 shows a typical temperature output voltage characteristic of a known detector which is employed in the temperature displaying device shown in FIG. 1.

Referring now to FIG. 1, there is shown a detector circuit 1 which provides an output voltage signal corresponding to a temperature to be detected. In the detector circuit 1, a constant bias is applied across the emitter and base of a pnp transistor 14. The bias voltage is provided by resistors 11 and 13 which are connected in series between ground and a d.c. voltage source 8. Reference numeral 12 indicates an emitter resistor. Such an arrangement is well known as a constant current source so that the current flowing through a sensor element 15 connected to the collector of transistor 14 is always constant. The sensor element 15, such as Temperature Sensitive Resistor TSR 5-1001F, varies the resistance value thereof in accordance with the temperature to be detected, and the output voltage signal $V_{15}$ corresponding to the temperature appears across the detector element 15, as shown in FIG. 2.

The output voltage signal $V_{15}$ of the detector circuit 1 is applied to a comparator circuit 2 to be compared to a predetermined reference voltage $V_{21}$. A comparator 22 has two input terminals; one of the terminals is connected to the output terminal of the detector circuit 1 and the other to an intermediate tap of a potentiometer 21, which permits the reference voltage $V_{21}$ to be adjusted. The output terminal of the comparator 22 is connected to an inverter 23.

When the detected output voltage $V_{15}$ is smaller than the reference voltage $V_{21}$, a signal of "1" level is provided at an output terminal of the comparator 22 and a signal of "0" level is provided at an output terminal of the inverter 23. On the other hand, when the detected output voltage $V_{15}$ is greater than the reference voltage $V_{21}$, a signal of "0" level is provided at the output terminal of the comparator 22 and a signal of "1" level is provided at the output terminal of the inverter 23. Here, the predetermined reference voltage $V_{21}$ of the potentiometer 21 is selected at the voltage $V_0$ which is equal to the voltage produced by the detector circuit 1 when the temperature to be detected is a certain boundary temperature. The boundary temperature in the case of this embodiment is 0° C., as shown in FIG. 2.

A switching circuit 3 is controlled by the output signal of the comparator circuit 2. When the output signal of the comparator 22 is at the "1" level, the output signal of the inverter 23 is at the "0" level, and electronic switches 31 and 32 of the switching circuit 3 are biased to the conductive state. Under such conditions, the other electronic switches 33 and 34 are both in the non-conductive state and the output voltage signal $V_{15}$ of the detector circuit 1 is applied to an input terminal 48 of an operational amplifier circuit 4 through switch 31. Another input terminal 49 is provided with a voltage $E_2$ applied from a variable d.c. voltage source 9 through switch 32.

When the output signal of the comparator 22 is at the "0" level and the output signal of the inverter 23 is at the "1" level, the electronic switches 31 and 32 biased to the non-conductive state and the other electronic switches 33 and 34 become conductive. The predetermined reference voltage $V_{21}$ is applied in this case to the input terminal 48 of the operational amplifier circuit 4 via switch 33 and the output voltage signal $V_{15}$ of the detector circuit 1 is applied to the another input terminal 49 of the operational amplifier circuit 4 via switch 34.

At the same time, the output signal of the comparator 22 and the output signal of the inverter 23 are connected to a state indicating device 5 which indicates the negative or positive sign of the detected temperature. When the output signal of the comparator 22 is at the "1" level, base current flows through a resistor 51 to the base of transistor 53, so that the transistor 53 is biased into the conductive state with the result that collector current flows through a collector resistor 57 and a photo diode 55 from the voltage source 8. The photo diode 55, therefore, emits light to indicate the minus sign.

In the same way, when the output signal of the inverter 23 is at the "1" level, transistor 54 becomes conductive due to the current applied through resistor 52 and another photo diode 56 indicating the plus sign radiates.

In the operational amplifier circuit 4, the input terminal 48 is connected to a minus input terminal of an operational amplifier 41 through an input resistor 42. A feed back resistor 43 is connected between the minus input terminal and an output terminal of the operational amplifier 41. The input terminal 49 of the operational amplifier circuit 4 is connected to ground through a series connection of resistors 44 and 45, the point of connection of which is connected to a plus input terminal of the operational amplifier 41.

As stated above, when the output signal of the comparator 22 is at the "1" level, the output voltage signal $V_{15}$ of the detector circuit 1 is applied to the minus input terminal of the operational amplifier 41, while a voltage obtained by dividing the voltage $E_2$ of the variable d.c. voltage source 9 by the resistors 44 and 45 is applied to the plus input terminal thereof.

Letting $V_{out}$ and $V_{im}$ be the output voltage and the minus input terminal voltage of the operational amplifier 41, respectively, $R_{42}$ and $R_{43}$ be the resistance values of the resistors 42 and 43, respectively, the following equation (1) is obtained:

$$\frac{V_{15} - V_{im}}{R_{42}} = \frac{V_{im} - V_{out}}{R_{43}} \tag{1}$$

From this equation (1), the voltage $V_{im}$ is given by the following equation (2):

$$V_{im} = \frac{R_{42} \cdot V_{out} + R_{43} \cdot V_{15}}{R_{42} + R_{43}} \tag{2}$$

On the other hand, on the plus input terminal of the operational amplifier 41, the following equation (3) holds by letting $R_{44}$ and $R_{45}$ be the resistance values of the resistors 44 and 45, respectively, and $V_{ip}$ be the plus input terminal voltage:

$$V_{ip} = \frac{R_{44}}{R_{44} + R_{45}} E_2 \tag{3}$$

Since both of the voltages at the minus and plus input terminals $V_{im}$ and $V_{ip}$ are nearly equal to each other and to the ground level because of the extremely large gain of the operational amplifier 41, the following equation (4) results:

$$\frac{R_{42} \cdot V_{out} + R_{43} \cdot V_{15}}{R_{42} + R_{43}} = \frac{R_{44}}{R_{44} + R_{45}} \cdot E_2 \tag{4}$$

Putting $R_{42} = R_{45} = R_1$ and $R_{43} = R_{44} = R_2$ in equation (4), the output voltage $V_{out}$ may be represented by the following equation (5):

$$V_{out} = \frac{R_2}{R_1} (E_2 - V_{15}) \tag{5}$$

Accordingly, the output voltage $V_{out}$ is a value proportional to the difference between the voltages $E_2$ and $V_{15}$, and represents the decremental characteristic with respect to the increase of the output voltage $V_{15}$ of the sensor 15.

On the other hand, when the output voltage of the comparator 22 is at the "0" level, the minus input terminal of the operational amplifier 41 receives the predetermined reference voltage $V_{21}$ corresponding to the boundary temperature, while the plus input terminal receives the output voltage signal $V_{15}$ of the detector circuit 1.

Here, the output voltage $V_{out}$ of the operational amplifier 41 is represented by the following equation (6) by substituting $V_{15}$ and $V_{21}$ for $E_2$ and $V_{15}$ in equation (5), respectively:

$$V_{out} = \frac{R_2}{R_1} (V_{15} - V_{21}) \tag{6}$$

Figure 3:
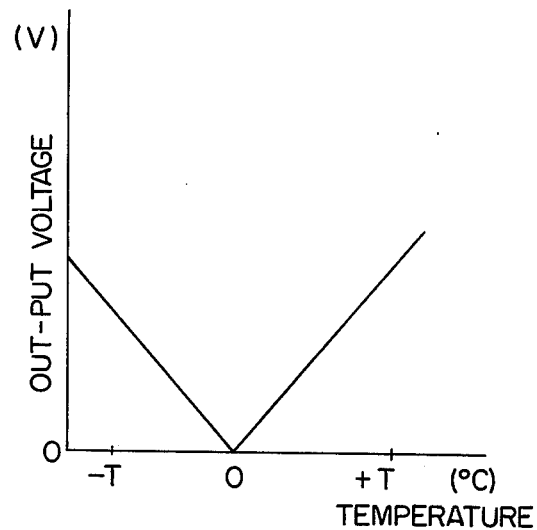
FIG. 3 shows a conversion characteristic of the signal converter shown in FIG. 1.

Under this condition, the output voltage signal $V_{15}$ of the detector circuit 1 is always greater than the voltage signal $V_{21}$ corresponding to the boundary temperature, so that equation (6) represents the incremental characteristic. The variable d.c. voltage source 9 is set at the level equal to the predetermined reference voltage $V_{21}$. In this way, an output signal having a characteristic as illustrated in FIG. 3 is provided at the output terminal of the operational amplifier circuit 4.

The output signal of the operational amplifier circuit 4 is converted into a digital form by an analog-digital converter 6, and is displayed on a digital display 7.

As understood from the foregoing description, according to this invention, the operations are enabled with the only one operational amplifier, and hence, it is possible to reduce the number of components and to achieve a significant reduction of cost.

While, in the above embodiment, description has been made of the case of the output characteristic in which the decremental characteristic shifts to the incremental one, an output characteristic which shifts to the decremental one is acquired by reversing the plus and minus input terminals of the comparator 22. Additionally, by varying the voltage $E_2$ of the variable d.c. voltage source 9, various conversion characteristics can be attained.

Figure 4:
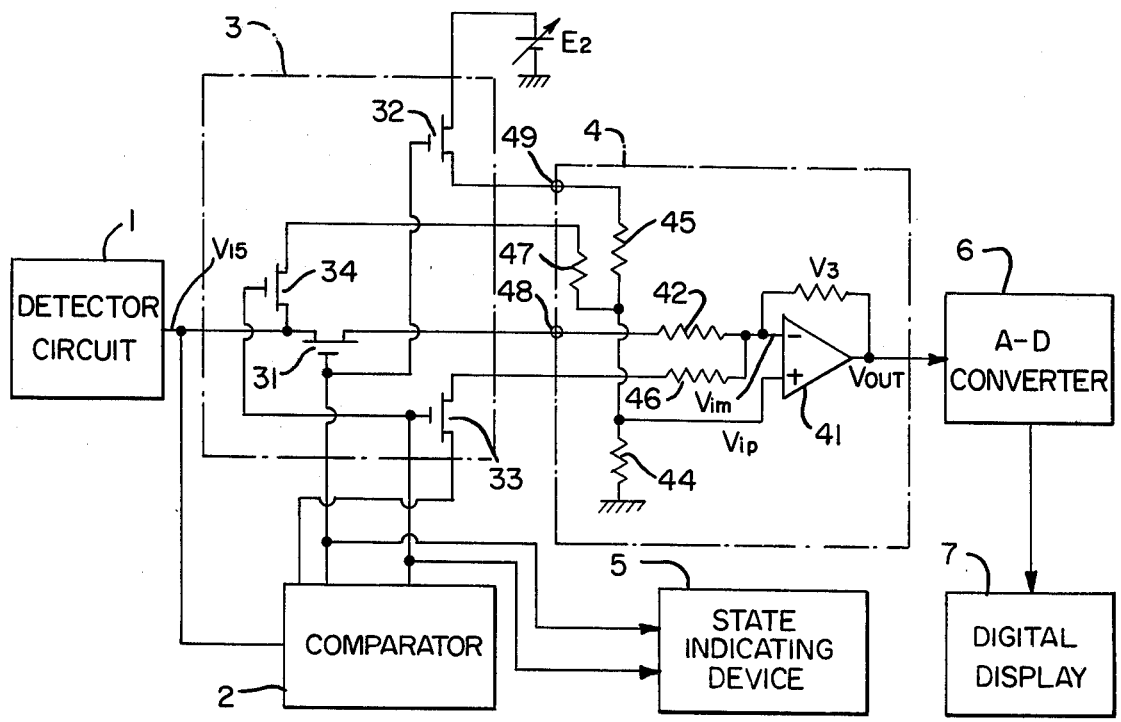
FIG. 4 shows another embodiment of this invention.

Referring now to FIG. 4, there is shown another embodiment of this invention. In this embodiment, resistors 46 and 47 are further provided. When the electronic switches 33 and 34 are in the conductive state, the output voltage signal $V_{15}$ is divided by the resistors 44 and 47 and applied to the plus input terminal of the operational amplifier 41. At the same time, the predetermined reference voltage $V_{21}$ is applied to the minus input terminal through the resistor 46. All the elements except those designated by reference numerals 46 and 47 are the same as indicated in FIG. 1.

When the resistance values of the resistors 46 and 47 are made equal and are denoted by $R_3$, equation (6) becomes the following equation (7):

$$V_{out} = \frac{R_2}{R_3} (V_{15} - V_{21}) \quad (7)$$

Further, this invention is applicable to any quantity of detection in addition to temperature detection insofar as it is detected in the form of a voltage and besides has incremental and decremental characteristics.

As set forth above, in accordance with this invention, various characteristics of conversion are acquired with a simple circuit arrangement.

What is claimed is:

1. A signal converter for converting a varying input signal into an output signal of absolute value comprising
    reference voltage producing means for generating a predetermined reference voltage value;
    comparing means responsive to said input signal and said predetermined reference voltage value for generating a control signal having first and second values indicating whether said input signal is greater or less than said reference voltage value, respectively;
    an operational amplifier circuit having first and second input terminals; and
    switching means responsive to said control signal for applying said input signal and said reference voltage value to said first and second input terminals of said operational amplifier, respectively, when said control signal has said first value, and for applying said input signal and said reference voltage value to said second and first input terminals of said operational amplifier, respectively, when said control signal has said second value.

2. A signal converter as claimed in claim 1, wherein said reference voltage producing means includes a variable voltage source.

3. A signal converter as claimed in claim 1, wherein said operational amplifier circuit has two different gains which are switched over by said switching means in response to the control signal from the comparing means.

4. A signal converter as claimed in claim 1, wherein said comparing means includes a comparator circuit having first and second inputs receiving said input signal and said reference voltage value, respectively, and an inverter circuit connected to the output of said comparator circuit.

5. A signal converter as claimed in claim 4, wherein said switching means includes first means responsive to the output of said comparator circuit for applying said input signal and said reference voltage value to said first and second input terminals of said operational amplifier.

6. A signal converter as claimed in claim 5, wherein said switching means further includes second means responsive to the output of said inverter circuit for applying said reference voltage value and said input signal to said first and second input terminals of said operational amplifier.

7. A signal converter as claimed in claim 6, wherein said first means includes first and second switches which are operated when said control signal has said first value, and said second means includes third and fourth switches which are operated when said control signal has said second value.

8. A signal converter as defined in claim 7, wherein said second and fourth switches are each connected to one of a voltage divider comprising first and second resistors connected in series, the point of connection of said first and second resistors being connected to the second input terminal of said operational amplifier circuit.

9. A signal converter as defined in claim 7, wherein said second switch is connected to one end of a voltage divider comprising first and second resistors connected in series, said fourth switch being connected in series with a third resistor to the point of connection of said first and second resistors which, in turn, is connected to the second input terminal of said operational amplifier circuit.

10. A signal converter as defined in claim 7, wherein said reference voltage producing means includes a first and second variable reference voltage source, said first reference voltage source being connected to said comparing means and said third switch, said second reference voltage source being connected to said second switch.

11. A signal converter as defined in claim 4, further including state indicating means responsive to the outputs of said comparator circuit and said inverter circuit for providing a visual indication of whether said control signal has a first or a second value.

12. A signal converter as claimed in claim 1, wherein said reference voltage producing means generates a predetermined reference voltage value having a predetermined value with respect to ground.

13. A signal converter as claimed in claim 10, wherein said first reference voltage source includes a variable resistor for applying said reference voltage value to an input terminal of said comparing means.

* * * * *